United States Patent
Gaid et al.

(10) Patent No.: US 10,752,520 B2
(45) Date of Patent: Aug. 25, 2020

(54) WATER TREATMENT PROCESS EMPLOYING DISSOLVED AIR FLOTATION TO REMOVE SUSPENDED SOLIDS

(71) Applicant: Veolia Water Solutions & Technologies Support, Saint-Maurice Cedex (FR)

(72) Inventors: Abdelkader Gaid, Paris (FR); Malik Djafer, Boulogne-Billancourt (FR); Delia Pastorelli, Vincennes (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 194 days.

(21) Appl. No.: 15/516,037

(22) PCT Filed: Sep. 29, 2015

(86) PCT No.: PCT/EP2015/072482
§ 371 (c)(1),
(2) Date: Mar. 31, 2017

(87) PCT Pub. No.: WO2016/050802
PCT Pub. Date: Apr. 7, 2016

(65) Prior Publication Data
US 2017/0297924 A1   Oct. 19, 2017

Related U.S. Application Data (60) Provisional application No. 62/058,831, filed on Oct. 2, 2014.

(51) Int. Cl.
*C02F 1/24* (2006.01)
*C02F 1/52* (2006.01)
(Continued)

(52) U.S. Cl.
CPC .............. *C02F 1/24* (2013.01); *B03D 1/1431* (2013.01); *B03D 1/247* (2013.01); *C02F 1/5245* (2013.01);
(Continued)

(58) Field of Classification Search
CPC .......... B03D 1/1431; B03D 1/247; C02F 1/24
See application file for complete search history.

(56) References Cited

U.S. PATENT DOCUMENTS 7,862,014 B2 *  1/2011  Lechner .................. C02F 3/203
                                                             261/122.1
7,947,178 B2   5/2011  Menke et al.
(Continued)

FOREIGN PATENT DOCUMENTS

CN   201132779 Y   10/2008
CN   202152290 U   2/2012
(Continued)

*Primary Examiner* — Bobby Ramdhanie
*Assistant Examiner* — Michael J An
(74) *Attorney, Agent, or Firm* — Coats & Bennett PLLC (57) ABSTRACT

A water or wastewater treatment process that includes a dissolved air flotation process for removing suspended solids from influent water or mixed liquor. In one process, the dissolved air flotation process is carried out in the absence of adding a coagulant or a flocculant, but yet produces TSS removal efficiencies comparable to those achieved by conventional dissolved air flotation processes that employ a coagulant and a flocculant. In other processes, a coagulant and/or a flocculant is added directly to the mixing zone of a dissolved air flotation system or is added via a pressurized white water injection system. In another process, the use of a coagulant and a flocculant is useful in removing TSS and reducing the concentration of phosphorus in the water being treated.

6 Claims, 5 Drawing Sheets

(51) Int. Cl.
*C02F 1/56* (2006.01)
*C02F 3/08* (2006.01)
*C02F 101/10* (2006.01)
*B03D 1/14* (2006.01)
*B03D 1/24* (2006.01)

(52) U.S. Cl.
CPC .................. *C02F 1/56* (2013.01); *C02F 3/08* (2013.01); *C02F 2101/105* (2013.01)

(56) References Cited

U.S. PATENT DOCUMENTS

| | | | |
|---|---|---|---|
| 8,431,027 B2* | 4/2013 | Hayes | C02F 1/24 210/221.2 |
| 8,518,266 B2 | 8/2013 | Roberts et al. | |
| 2008/0047903 A1 | 2/2008 | Morse | |
| 2009/0211974 A1* | 8/2009 | Bonnelye | B01D 21/0012 210/636 |
| 2009/0294355 A1* | 12/2009 | Menke | C02F 1/24 210/605 |
| 2010/0018918 A1* | 1/2010 | Troubounis | C02F 1/24 210/604 |
| 2010/0314324 A1* | 12/2010 | Rice | B03D 1/1431 210/706 |
| 2011/0198295 A1* | 8/2011 | Dumoulin | B03D 1/24 210/703 |
| 2014/0319036 A1* | 10/2014 | Mane | B03D 1/1431 210/151 |
| 2016/0075577 A1* | 3/2016 | Reid | C02F 3/085 210/605 |

FOREIGN PATENT DOCUMENTS

| | | |
|---|---|---|
| CN | 103086456 A | 5/2013 |
| EP | 0789672 | 7/1996 |
| WO | 2012065250 A1 | 5/2012 |
| WO | WO 2013/171509 A1 * 11/2013 | ............ B03D 1/14 |

* cited by examiner

WATER TREATMENT PROCESS EMPLOYING DISSOLVED AIR FLOTATION TO REMOVE SUSPENDED SOLIDS

RELATED APPLICATIONS

The present application is a U.S. National Stage Application of PCT Application No. PCT/EP2015/072482, with an international filing date of Sep. 29, 2015. Applicant claims priority based on U.S. Patent Application No. 62/058,831 filed Oct. 2, 2014. The subject matter of these applications is incorporated herein in their entirety.

FIELD OF THE INVENTION

The present invention relates to water or wastewater treatment processes and more particularly to processes that utilize dissolved air flotation to remove suspended solids.

BACKGROUND OF THE INVENTION

Dissolved air flotation (DAF) processes are known. Conventional DAF processes include injecting a coagulant into the water, mixing the coagulant with the water, injecting a flocculant into the water, mixing the flocculant in water, and then directing the coagulated and flocculated water to a zone where pressurized water, commonly referred to as white water, is injected and mixed with the water to be clarified. After the white water has been mixed with the coagulated and flocculated water, the water is directed to a separation zone which separates solids from the water through a dissolved air flotation process.

The basic principle of flotation for clarification is fundamentally the same regardless of the technology being used. By introducing gas or air to the water that is being treated, separation of solids from the water being treated is achieved. Gas bubbles are typically injected near the bottom of a basin which contains solids and flocculated particles to be separated from the liquid phase. Air bubbles attach to these solids via surface attachment and, in turn, cause the particles to rise to the surface. The floc particles that are formed and which have been floated to the surface form a discrete layer of sludge known as a "blanket" or "float". This blanket of sludge can be removed by either hydraulic wasting or through mechanical scraping.

One of the drawbacks or shortcomings with a DAF process which utilizes chemicals is the cost to implement and operate such a process. An example of a dissolved air flotation system and a typical application may be helpful in appreciating the cost associated with chemical addition. For example, a wastewater plant may include a primary settler, a moving bed biological reactor (MBBR), and a dissolved air flotation system for removing suspended solids from the effluent from the MBBR unit. In this example, assume that the DAF unit is designed to treat 26,240 m$^3$/day of wastewater. The DAF unit includes a coagulation stage, a flocculation stage, and a flotation stage. Chemicals such as a coagulant, for example ferric chloride, and a flocculant such as a polymer are injected into the water upstream of the flotation zone or stage. In this example, the velocity or mirror rate in the separation zone is about 7.6 m/h. The average efficiency for the removal of total suspended solids may be approximately 90%, thanks to the addition of the coagulant and flocculant. It has been generally observed, however, that when the chemicals are not added there is a substantial reduction in the total suspended solids removal efficiency.

Moreover, it is often challenging to properly implement the injection of coagulants and flocculants in dissolved air flotation processes. If not properly implemented, the total suspended solids removal efficiency in the DAF declines. For example, if there is too short of a contact time between the white water and the water being treated, then removal efficiency suffers. Likewise, if the velocity gradient (G) is not suitable, then the removal efficiency of suspended solids is reduced.

Conventional DAF systems are used throughout the world in a variety of ways. For example, they are used to treat drinking water for the removal of algae, floating materials, oil and disposal of substances responsible for color (humic and fulvic substance types), and colloidal substances present in raw water. In addition, conventional DAF systems are used in the desalination of sea water, pre-treatment of sea water for removing algae, oil, colloidal substances and particles responsible for clogging membranes. Finally, conventional DAF systems are widely used for removing suspended solids in the treatment of wastewater.

These conventional DAF systems and processes have drawbacks. First, they typically produce a low mirror velocity or rate, typically less than 10 m/h in the separation zone and hence, in the order to achieve desired capacity, the system must be designed to occupy a greater area. Further, conventional DAF systems require the preparation and conditioning of the substances to be removed by using specific stages of coagulation and flocculation in which chemical reagents are injected. As outlined above, the chemicals consumed are expensive and the energy consumed for driving mixers is costly.

Therefore, there is a need for a DAF system and process that is both effective and efficient without the need to add chemicals.

SUMMARY OF THE INVENTION

The present invention relates to a dissolved air flotation process for clarifying water or mixed liquor. In one embodiment, instead of injecting a coagulant or a flocculant upstream of the separation zone as is conventional in dissolved air flotation processes, the present invention does not utilize either a coagulant or flocculant but yet achieves total suspended solids (TSS) removal efficiency comparable to those achieved with conventional DAF processes that use chemicals, that is a coagulant and a flocculent.

In one embodiment, the present invention provides a DAF process where there is no injection of chemicals, and yet the mirror rate achieved in the separation zone is at least 20 m/h with a TSS removal efficiency that exceeds 80%.

In other embodiments, a coagulant and/or a flocculant is directly injected into the mixing zone of the DAF or into pressurized white water which in turn is ejected from one or more nozzles into the mixing zone.

Still in some cases, the dissolved air flotation system and process of the present invention is employed to remove both phosphorus and TSS from the influent water or mixed liquor. In this case, a flocculant in the form of a polymer and a coagulant such as ferric chloride is mixed with the water or mixed liquor.

Other objects and advantages of the present invention will become apparent and obvious from a study of the following description and the accompanying drawings which are merely illustrative of such invention.

DESCRIPTION OF THE PREFERRED EMBODIMENTS

With further reference to the drawings, a flotation-type clarification system is shown therein and indicated generally by the numeral 10. As will be discussed subsequently herein, the clarification system 10 is designed to receive water or mixed liquor that includes suspended solids and through a process of air flotation, the clarification system is designed to remove suspended solids from the water or mixed liquor.

As the drawings depict, the clarification system 10 includes a tank 14. Tank 14 includes a bottom and surrounding sides. Formed in the tank is a separation zone 16. In some cases, the separation zone 16 is referred to as a flotation zone. Disposed upstream of the separation zone 16 is a mixing or contact zone 18. As shown in the drawings, the tank 14 includes a wall 20 that divides the tank and forms the separation and mixing zones 16 and 18.

Formed in the bottom of the tank 14 or in the lower portion of the separation zone 16, is a clarified water takeup zone 22. This can assume various forms. In one embodiment, the clarified water takeup zone includes a chamber 24 that includes a perforated top. Clarified water in the separation zone 16 enters the perforated top of the chamber 24 and is directed out an outlet 25.

There is provided an influent feed line 26. This leads to an inlet zone 28 that is located upstream of the mixing zone 18. A perforated panel 30 divides the inlet zone 28 from the mixing zone 18. During a dissolved air flotation process, water or mixed liquor is pumped into the inlet zone 28 and up through the perforated panel 30 into the mixing zone 18.

Clarification system 10 includes a pressurized white water generating system 34 for injecting white water under pressure into the mixing zone 18. White water injection system includes one or more nozzles 32 disposed in the lower portion of the mixing zone 18 above the perforated panel 30. Systems for generating white water are well known in the art. For example, a typical white water generating system includes a white water pump that pumps clarified water from the bottom of the separation zone 16 through a pre-filter. From the pre-filter, the clarified water or the white water is directed to a holding vessel and from the holding vessel downwardly to the nozzles 32 where the white water is ejected into the mixing zone 18.

As will be discussed subsequently herein, the system and process will cause floc to rise to the surface of the water in the separation zone 16. A sludge scraper 38 is provided about an upper portion of the clarification system 10. Sludge scraper 38 can move back and forth across the top of the clarification system and includes a scraper for engaging the sludge blanket on the upper surface of the water and scraping the sludge to a sludge outlet 40 where the sludge is discharged from the clarification system 10.

In one embodiment, the clarification system 10 is designed to flocculate and remove suspended solids without chemical addition. This will be addressed in more detail below. In other embodiments such as where it is desirable to remove phosphorus, chemicals, such as a coagulant or a flocculant, is added. However, when chemicals are added, it is preferable to add the chemicals into the mixing zone 18 directly or via the white water injection system.

Figure 2:
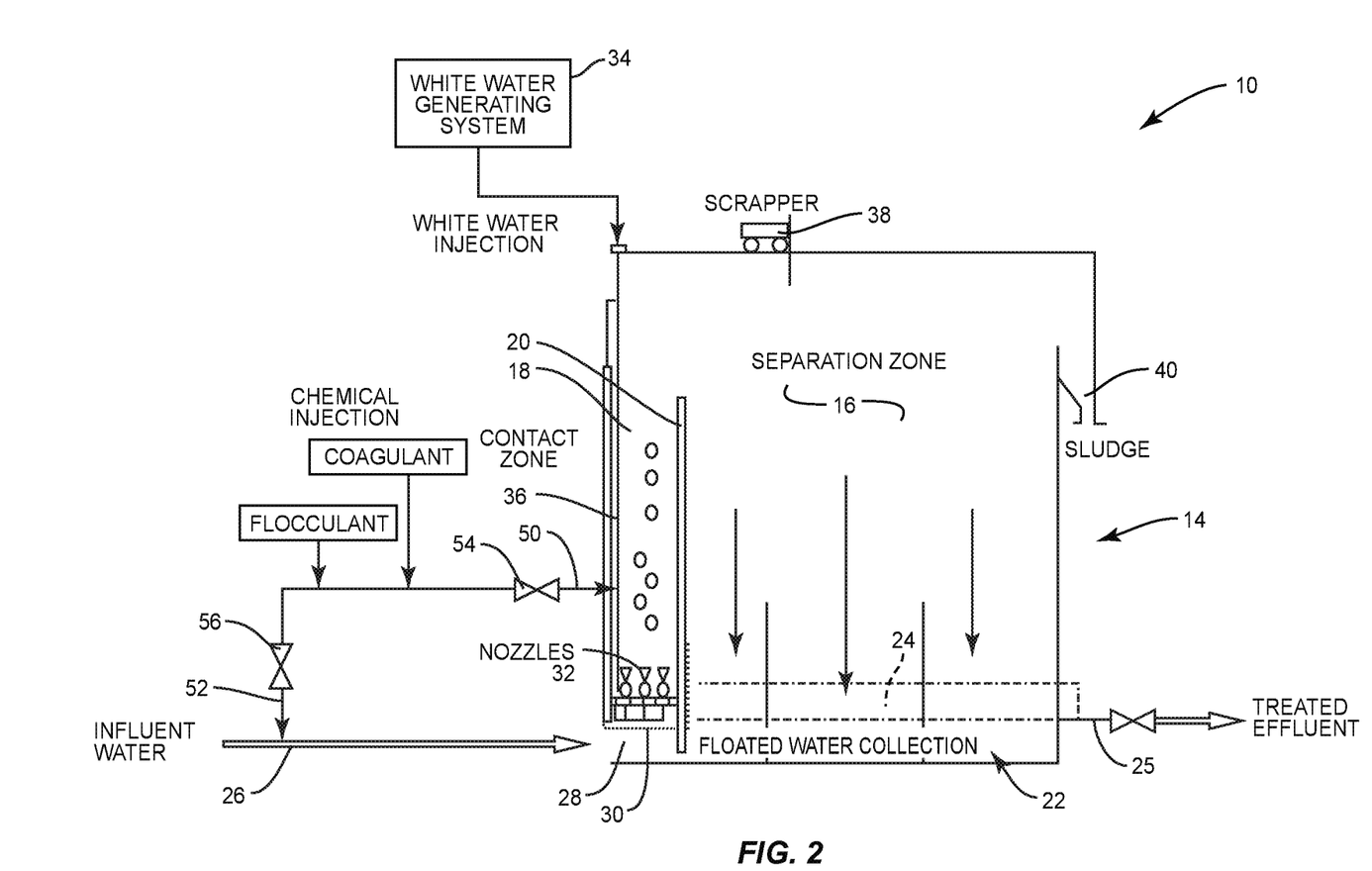
FIG. 2 shows an alternate dissolved air flotation system that provides a means for injecting chemicals, such as a coagulant or flocculant, into the pressurized white water or directly into the feed that is being directed into an inlet zone of the dissolved air flotation system.

FIG. 2 shows one example of a number of ways in which a coagulant or a flocculant can be added to the water. Here, there is provided two chemical feed lines 50 and 52. Each line includes a control valve 54, 56. Note that feed line 50 is plumbed into the white water feed line 36. By closing valve 56, chemicals can be directed through control valve 54 and feed line 50 into the white water feed line 36. By closing valve 54, a coagulant or a flocculant can be directed through control valve 56 and line 52 into the influent water at a point upstream from the mixing zone 18.

Figure 2A:
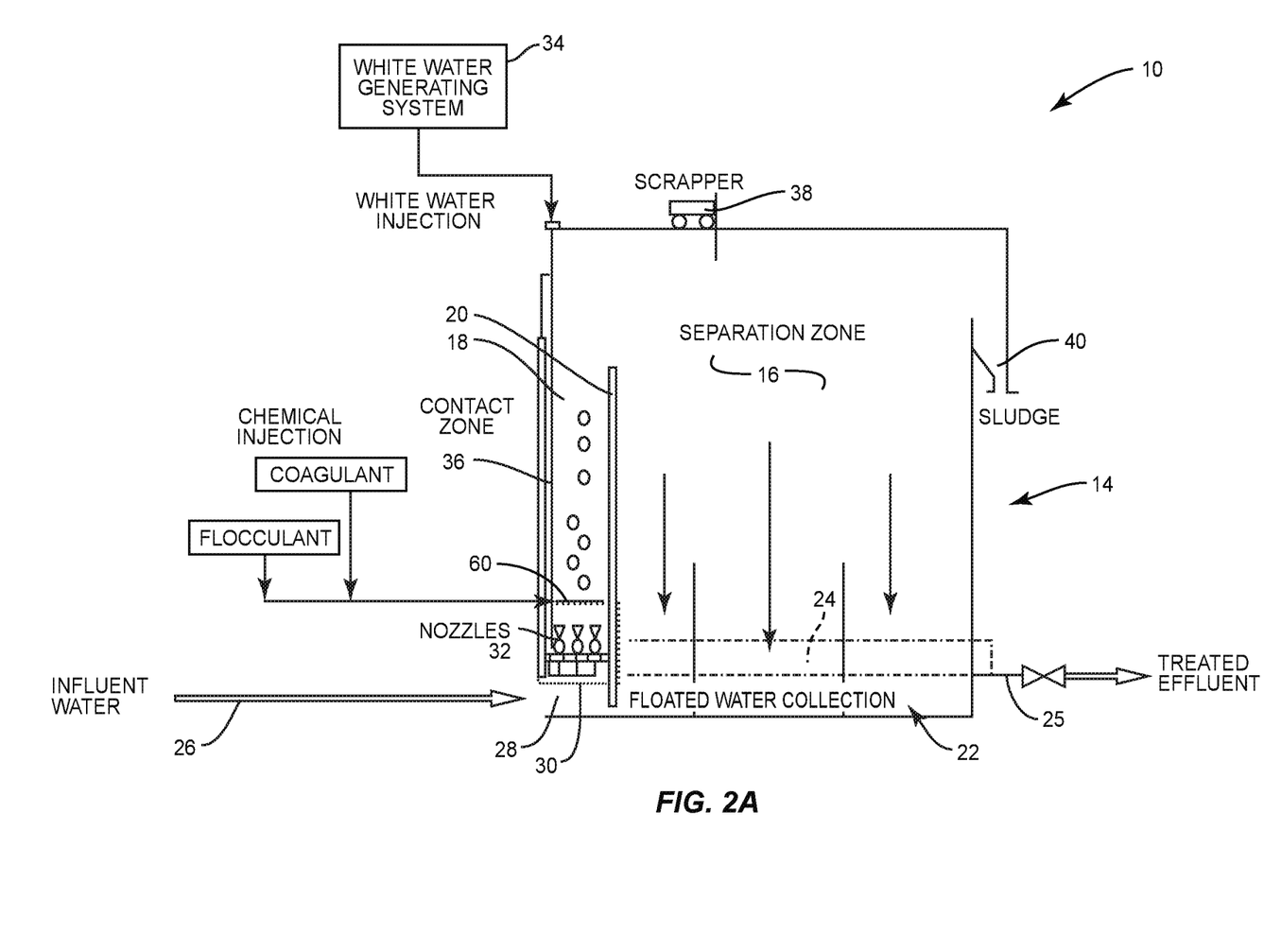
FIG. 2A is an alternate view of the DAF system shown in FIG. 2 which provides for the injection of a coagulant and/or a flocculant into the mixing zone via a diffuser.

There are other ways and means of injecting a coagulant or a flocculant into the mixing zone 18. For example, a diffuser 60 can be disposed above or below the nozzles 32 and operatively connected to a supply of a coagulant and/or a flocculant. See FIG. 2A. A chemical feed pump can be provided for pumping the coagulant and/or the flocculant from the supply into the diffuser. In one embodiment, the diffuser 60 or other means for injecting a coagulant or a flocculant into the mixing zone 18 can be placed approximately 5 to approximately 20 cm. above the nozzles 32. In other embodiments, the chemical addition system can be designed to inject the coagulant into one area of the mixing zone 18 while injecting the flocculant into another area of the mixing zone 18. In other embodiments, the chemical addition system can be designed to inject either the coagulant or the flocculant into the white water feed line 36 while injecting the other directly into the mixing zone 18.

Clarification system 10 has been generally described. U.S. Pat. No. 8,753,508 shows and describes a clarification system and a process for clarifying water. The disclosure of U.S. Pat. No. 8,753,508 is expressly incorporated herein by reference.

Figure 3:
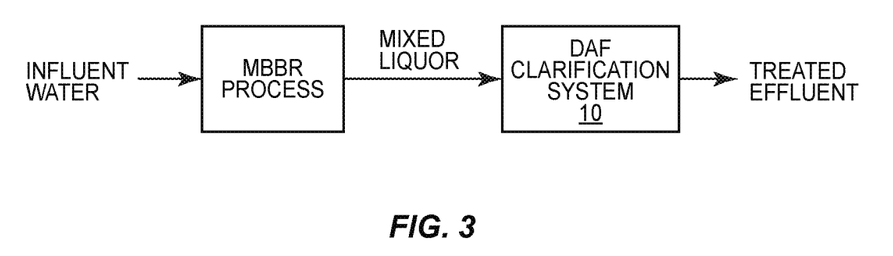
FIG. 3 is a schematic illustration showing the DAF system and process of the present invention being employed downstream of a moving bed bioreactor.

Briefly reviewing the clarification process, influent water or mixed liquor is directed through line 26 into the inlet zone 28. It should be noted that the influent water can be raw water, that is untreated water, or it may be water that has been subjected to a pre-treatment process. For example, the clarification system 10 of the present invention may be employed downstream of an MBBR process. See FIG. 3. In this case, the influent water (e.g. mixed liquor) directed into line 26 is referred to as mixed liquor.

Water is pumped under pressure up through the perforated panel 30 into the mixing zone 18. There the water is mixed with the white water that has undergone pressurization and, once emitted from the nozzles, is depressurized. The contact time between the water to be treated and the emitted white water can vary. In one example, the contact time is approximately 2-5 minutes. Reducing the bubble size increase the capture efficiency. The white water generating system 34 is operative to provide a dissolved air flotation process for removing suspended solids in the influent water. In particular, the white water generating system takes a portion of the clarified water from outlet 25 or the bottom of the separation zone 16 and pressurizes the water to form what is referred to as white water. This white water under pressure is pumped through line 36 to the nozzles 32. The nozzles are designed to inject the white water, including small air bubbles (less than 50 microns in diameter), into the mixing zone 18 where the air bubbles are mixed with the water from the collection zone 28. Suspended solids in the water attach to the air bubbles and form floc, which are buoyant. The floc comprising agglomerated suspended solids rise upwardly with the attached air bubbles in the mixing zone 18.

Figure 1:
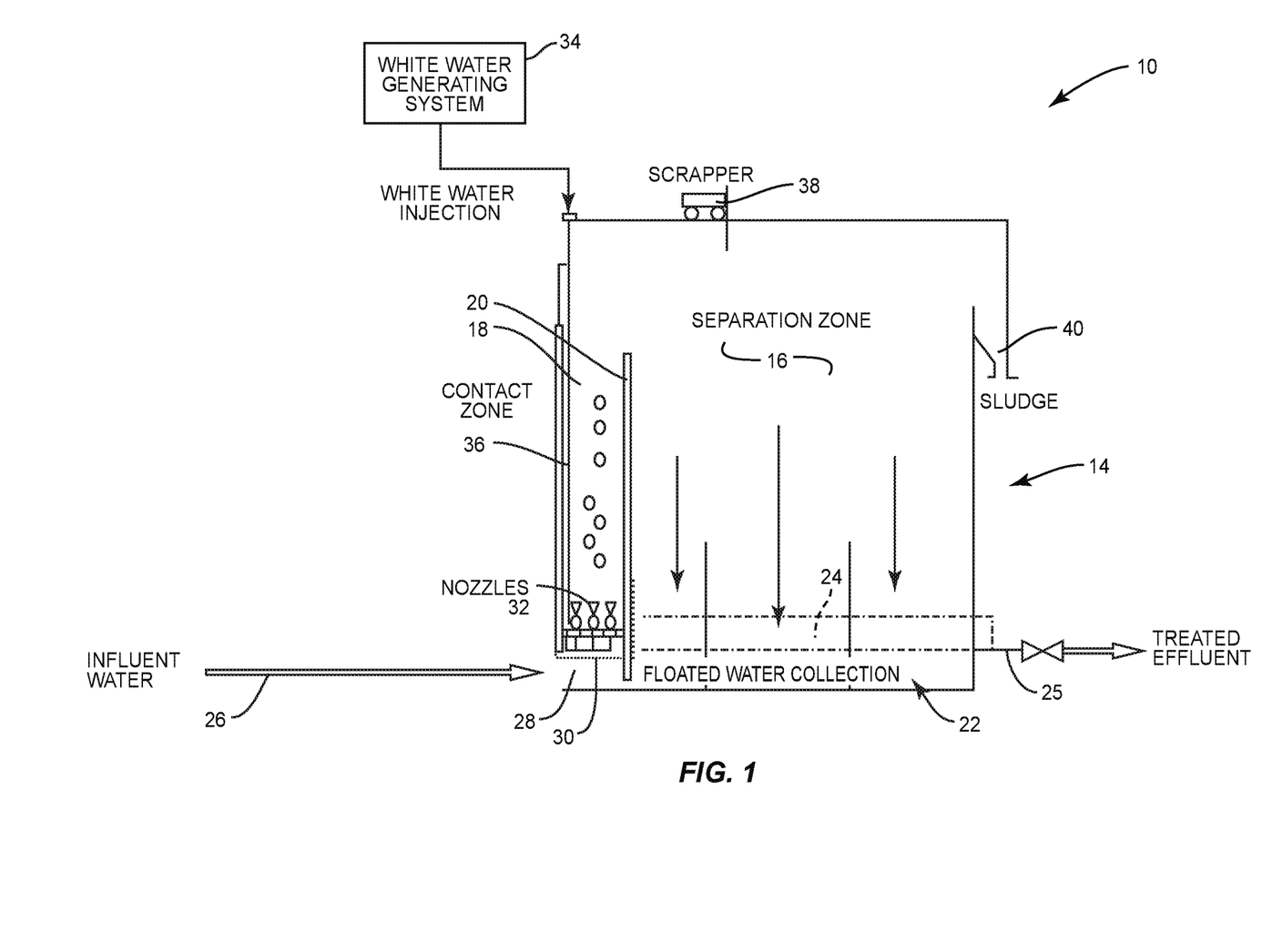
FIG. 1 shows a dissolved air flotation system according to the present invention.

As seen in FIG. 1, for example, the water in the mixing zone 18, along with the floc, pass over the upper edge of wall 20 into the separation zone 16. In the separation zone 16, the floc and air bubbles continue to rise to the upper surface on the water contained in the separation zone. The floc forms the sludge layer or a sludge blanket on the upper surface of the water. Water held in the lower portion of the separation zone 16 is clarified water. This clarified water enters the clarified water chamber 24 and is directed therefrom out of the tank 14 via the outlet 25. As referred to above, a portion of the clarified effluent is utilized by the white water generating system to generate pressurized white water for injecting into the mixing zone 18.

In earlier discussions, it was pointed out how the use of chemicals greatly increased the cost of air flotation clarification processes. The capital cost of constructing coagulation and flocculation tanks or other structures to accommodate coagulation and flocculation processes is significant. Further, there is the equipment for delivering, mixing and monitoring the chemicals. This too is expensive. The inventors have discovered an air flotation clarification process can be carried out without coagulants or flocculants, but still achieve TSS removal efficiency comparable to those of conventional DAF processes that rely on coagulants and flocculants.

The surprising performance of the process described herein where coagulation and flocculation is not used can be explained by flocculation conditions. During the flocculation step, a multitude of micro-flocs is formed and the probability of encounters between these micro-flocs to form macro-flocs are made by mechanical agitation of the water corresponding to a low turbulence (low velocity Gradient G). The principle is that the growth of micro-flocs into larger aggregates accelerates the phase separation. Thus, all things being equal, the increasing of the diameter of floc promotes flocculation and the velocity gradient G cannot be too high because the flocs may be broken due to too high shear forces.

The value of the velocity gradient (G) usually used for the flocculation stage in conventional DAF processes is <100 sec$^{-1}$ and more particularly about 60 sec$^{-1}$. The velocity gradient is given by:

$$G = \sqrt{\frac{P}{\mu V}}$$

Where:
P: power dissipated by the blades of the stirrer [W]
V: volume occupied by the wastewater or mixed liquor fluid [m3]
μ: dynamic viscosity of water [Pa].

In a DAF system, following coagulation and flocculation, the water enters the contact zone. In the contact zone, flocculated particles are floated by micro-bubbles to the surface of the flotation basin. Micro-bubbles attach to the floc particles via surface attachment and are produced by the depressurization of a partially air-saturated pressurized recycle stream. This recycle stream is a portion of the clarified effluent stream (typically 8 to 12 percent of the effluent flow).

The recycle stream is recycled by a recycle pump and is pressurized. Depressurization of the recycle stream takes place through nozzles that are fixed to a header that is located at the entrance of the contact zone. Clarified water is collected as it passes through a pipe and leaves the unit over an adjustable weir into a clarified water tank.

In a DAF process, particle capture efficiency is a function of bubble size, among other parameters. Flotation used to achieve a solid-liquid separation by injection uses fine air bubbles (<50 microns) which will be a very lightweight aggregate and present high velocities. The production of fine air bubbles is achieved by recirculating part of the clarified water under a pressure of 5-7 bars. By injecting the water to be treated directly into the contact or mixing zone 18, the turbulence associated with the injection of fine air bubbles leads to the formation of a velocity gradient determined as follows:

$$G = \sqrt{\frac{P}{\mu V}}$$

$P(W)=Q$ white water (m3/s)×$p$ white water (m×g(m/s$^2$)×$\Gamma$(kg/m3)

P White Water: 7 bars: 70 m
g: 9.8 m/s$^2$
Γ: 1000 kg/m3
μ: dynamic viscosity of 0.001 Pa·s water The present process provides high velocity or mirror rates (20-60 m/h) in the separation zone and allows for a smaller plant footprint compared with conventional DAF systems used for wastewater treatment. Consider, for example, a flow rate of 10 m$^3$/h and a contact time of 2 minutes. This results in the volume of the contact area to be 0.33 m$^3$. The calculation results in a G value of 24.2 s$^{-1}$. This confirms that it is plausible to operate the DAF system 10 of the present invention without chemicals and achieve a favorable TSS removal efficiency. That is, this confirms that under these hydrodynamic conditions in the mixing or contact zone 18 that a successful implementation of a flocculation process can be achieved that is sufficient to create collisions between the air bubble and flocs.

Table 1 below shows a series of tests performed in a DAF system similar to that shown in FIG. 1. Two influent flow rates were tested: 20 m$^3$/h and 28 m$^3$/h. The pressurized white water recirculation rates tested were 10, 15, 20 and 25%. Two TSS influent concentrations were tested. One is referred to a medium concentration where the TSS inlet concentration was 250 mg/L. The second TSS inlet concentration, referred to as the high TSS concentration, was 500 mg/L.

| PERFORMANCES WITHOUT CHEMICAL REAGENTS (MANUAL SAMPLING) JANUARY TO FEBRUARY 2013 | | | | | |
| --- | --- | --- | --- | --- | --- |
| Influent Flow Rate and TSS Inlet Concentration | Mirror velocity (m/h) | TSS inlet Average (mg/l) | TSS Outlet Average (mg/l) | TSS removal efficiency Average (%) | Specific electric energy (Wh/m3) |
| 20 m3/h Medium TSS conc. | | | | | |
| 10% | 22 | 299.6 | 33.2 | 88.9 | 45 |
| 15% | 23 | 164.9 | 10.8 | 93.4 | |

-continued

PERFORMANCES WITHOUT CHEMICAL REAGENTS (MANUAL SAMPLING) JANUARY TO FEBRUARY 2013

| Influent Flow Rate and TSS Inlet Concentration | Mirror velocity (m/h) | TSS inlet Average (mg/l) | TSS Outlet Average (mg/l) | TSS removal efficiency Average (%) | Specific electric energy (Wh/m3) |
|---|---|---|---|---|---|
| 20% | 24 | 165.4 | 8.3 | 94.9 | |
| 25% | 25 | 135.2 | 6.7 | 95.0 | 83 |
| 30% | 26 | 233.6 | 10.8 | 95.3 | |
| High TSS conc. | | | | | |
| 10% | 22 | 545.6 | 67.1 | 87.7 | 45 |
| 15% | 23 | 586.7 | 59.7 | 89.8 | 65 |
| 20% | 24 | 537.0 | 35.7 | 93.4 | 85 |
| 25% | 25 | 546.8 | 29.9 | 94.5 | 103 |
| 30% | 26 | 535.9 | 21.1 | 96.1 | 115 |
| 28 m3/h Medium TSS conc. | | | | | |
| 10 | 30.8 | 136.5 | 11.1 | 91.8 | |
| 15 | 32.2 | 136.8 | 8.7 | 93.3 | 50 |
| 20 | 33.6 | 181.0 | 11.3 | 93.8 | 67 |
| 25 | 35.0 | 120.0 | 6.2 | 94.8 | 89 |
| High TSS conc. | | | | | |
| 10 | 30.8 | 448.8 | 31.9 | 92.9 | |
| 15 | 32.2 | 339.1 | 17.3 | 94.9 | |
| 20 | 33.6 | 410.6 | 17.7 | 95.7 | |
| 25 | 35.0 | 427.8 | 21.4 | 94.8 | |

All of the TSS removal efficiencies exceed 80%. Most are in the 93-96% range. All of the mirror or velocity rates exceed 20 m/h. A considerable number of the tests show mirror rates in the range of 30-35 m/h. This is surprising for a dissolved air flotation process used for clarifying mixed liquor or water without the use of a coagulant or a flocculant.

In these tests, the concentration of the sludge was in the range of 35-40 g/L. The TSS was in the range of 80-84%.

Figure 4:
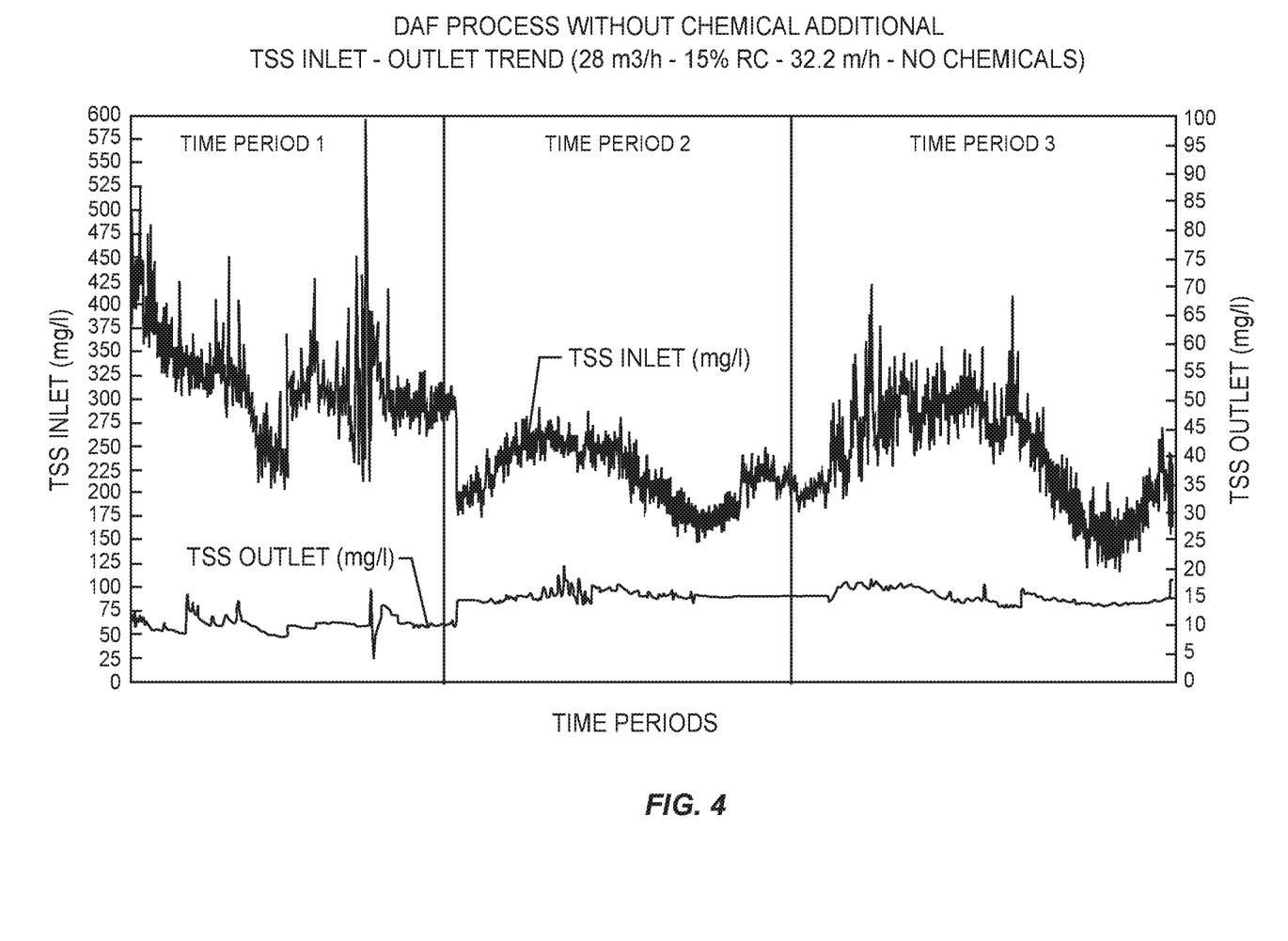
FIG. 4 is a graph showing typical test results of the DAF process of the present invention operated at various time periods and without employing chemicals.

FIG. 4 is a graphical representation of three tests conducted over three time periods to determine the TSS removal efficiency for the dissolved air flotation system 10 of the present invention when the process is carried out without the addition of chemicals. In particular, the influent flow for these tests was 28 m³/h. A 15% clarified water recycle was used for the white water. The average mirror rate during these three tests was 32.2 m/h. Note in time period 1 that the concentration of TSS in the influent water was relatively high, sometimes measuring over 400 mg/l. As FIG. 4 shows, in all three tests, the concentration of TSS at the outlet was less than 20 mg/l. These are tests that were conducted without employing chemicals.

The test conducted entailed an MBBR process followed by a dissolved air flotation process, according to the system shown in FIG. 1, with some tests being conducted with chemicals and some without. Based on the test, it is hypothesized that one preferred approach to removing total suspended solids is to employ a 15% recycle of white water without the use of chemicals. Another preferable process is to provide a 10% recycle with white water with a 1 mg/L dosage of a polymer. In cases where it is desirable to remove both TSS and phosphorus, these tests indicate that a desirable approach is to employ a 10% white water recycle and dose the water in the mixing zone 18 with 1 mg/L of polymer and 50 mg/L of ferric chloride.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of clarifying water containing suspended solids in a dissolved air flotation system to produce clarified effluent, comprising:
    (a) directing the water to be clarified into a mixing zone;
    (b) pressurizing a portion of the clarified effluent to form pressurized white water;
    (c) directing the pressurized white water to one or more nozzles in the mixing zone and injecting the pressurized white water, including air bubbles, into the mixing zone;
    (d) mixing the air bubbles with the water to be clarified in the mixing zone;
    (e) attaching the air bubbles to the suspended solids in the water in the mixing zone to form floc;
    (f) directing the water and floc from the mixing zone to a separation zone;
    (g) separating the floc from the water by floating the floc to a surface of the water in the separation zone and producing the clarified effluent in a lower portion of the separation zone, the produced clarified effluent being collected in the lower portion of the separation zone;
    (h) injecting a coagulant or a flocculant into the pressurized white water upstream of the one or more nozzles and mixing the coagulant or flocculant with the pressurized white water prior to discharging the pressurized white water from the one or more nozzles;
    (i) wherein the pressurized white water discharged from the one or more nozzles includes the coagulant or flocculant; and
    (j) maintaining for a selected time period an average mirror rate in the separation zone greater than 20 m/h and maintaining at least an 80% reduction in total suspended solids in the clarified effluent relative to the water to be treated by maintaining sufficient turbulence in the mixing zone due to the pressurized white water and air bubbles being discharged in the mixing zone to yield a veracity gradient sufficient to maintain said mirror rate and to maintain said at least 80% reduction in total suspended solids.

2. The method of claim 1 wherein the dissolved air flotation system is located downstream from a biological water treatment unit and the method includes biologically treating the water prior to the water being directed into the mixing zone of the dissolved air flotation system.

3. The method of claim 2 wherein the biological water treatment unit comprises a moving bed bioreactor.

4. A method of clarifying water containing suspended solids in a dissolved aft flotation system to produce clarified effluent, comprising:
    (a) directing the water to be clarified into a mixing zone;
    (b) pressurizing a portion of the clarified effluent to form pressurized white water;
    (c) directing the pressurized white water to one or more nozzles in the mixing zone and injecting the pressurized white water, including air bubbles, into the mixing zone;
    (d) mixing the air bubbles with the water to be clarifier in the mixing zone;
    (e) attaching the aft bubbles to the suspended solids in the water in the mixing zone to form floc;

(f) directing the water and floc from the mixing zone to a separation zone;
(g) separating the floc from the water by floating the floe to a surface of the water in the separation zone and producing the clarified effluent in a lower portion of the separation zone, the produced clarified effluent being collected in the lower portion of the separation zone;
(h) injecting a coagulant or flocculant into the pressurized white water or directly into the mixing zone; and
(i) maintaining for a selected time period an average mirror rate in the separation zone greater than 20 m/h and maintaining at least an 80% reduction in total suspended solids in the clarified effluent relative to the water to be treated by maintaining sufficient turbulence in the mixing zone due to the pressurized white water and air bubbles being discharged in the mixing zone to yield a velocity gradient sufficient to maintain said mirror rate and said at least 80% reduction in total suspended solids.

5. The method of claim 4 including directing the coagulant or flocculant to a diffuser disposed in the mixing zone and diffusing the coagulant or flocculant from the diffuser.

6. The method of claim 5 wherein the diffuser is positioned approximately 5-20 cm above the one or more nozzles and wherein the coagulant or flocculant is diffused directly in the mixing zone from the diffuser.

\* \* \* \* \*